United States Patent [19]

Nederman

[11] 4,233,889
[45] Nov. 18, 1980

[54] TRACK FORMING A GAS-THROUGHFLOW DUCT AND PROVIDED WITH A MOVABLE GAS PASSAGE UNIT

[76] Inventor: Bill P. P. Nederman, Halalid 3, Helsingborg S-252 33, Sweden

[21] Appl. No.: 970,090

[22] Filed: Dec. 15, 1978

[30] Foreign Application Priority Data

Dec. 16, 1977 [SE] Sweden .............................. 7714340

[51] Int. Cl.³ .............................................. F23J 15/00
[52] U.S. Cl. ................................. 98/115 VM; 104/52; 137/580; 202/263
[58] Field of Search .................. 98/115 VM; 137/580; 202/263; 104/52

[56] References Cited

U.S. PATENT DOCUMENTS

| | | | |
|---|---|---|---|
| 3,035,672 | 5/1962 | Tuten et al. | 189/85 |
| 3,913,470 | 10/1975 | Cullen | 98/115 VM |
| 3,974,619 | 8/1976 | Turner | 52/726 |
| 4,117,773 | 10/1968 | Johnson | 98/115 VM |

FOREIGN PATENT DOCUMENTS 2246043 3/1974 Fed. Rep. of Germany .... 98/115 VM

*Primary Examiner*—Ronald C. Capossela
*Attorney, Agent, or Firm*—Schwartz, Jeffery, Schwaab, Mack, Blumenthal & Koch

[57] ABSTRACT

A track which forms a gas throughflow duct. The track is of the type adapted for guiding a movable gas passage unit therealong in sealing cooperation with the gas throughflow duct. The track includes a plurality of structural girders disposed in abutting relationship and a plurality of lateral sections which are readily connectable with the girders to depend therefrom in pairs. A plurality of interengaging sealing sections are readily joined to the lateral sections, and these sealing sections are adapted to engage the movable gas passage unit to allow the unit to be moved along the track while maintaining the seal. The lateral sections extend longitudinally to either side of joints between the structural girders. Thus, the lateral sections contribute to effecting interconnection of the girders to each other.

15 Claims, 10 Drawing Figures

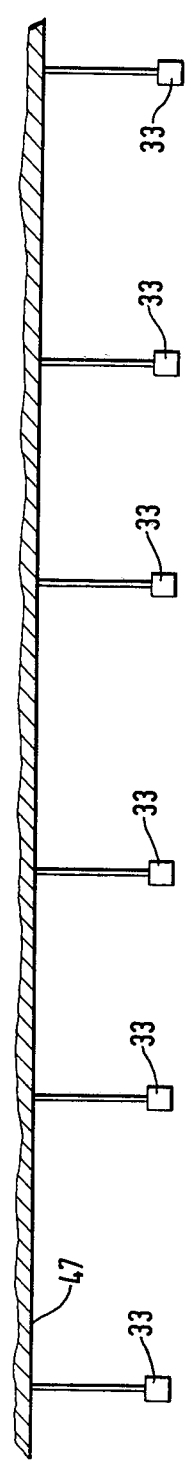
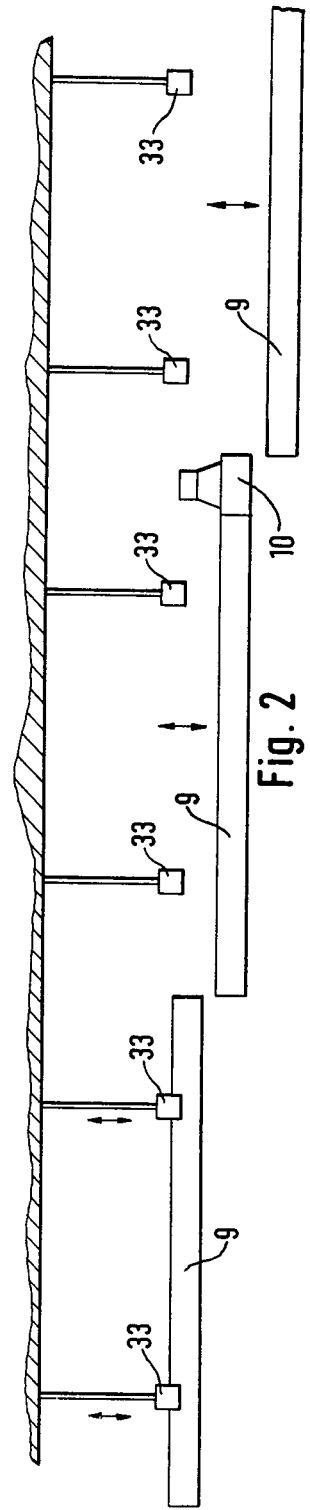
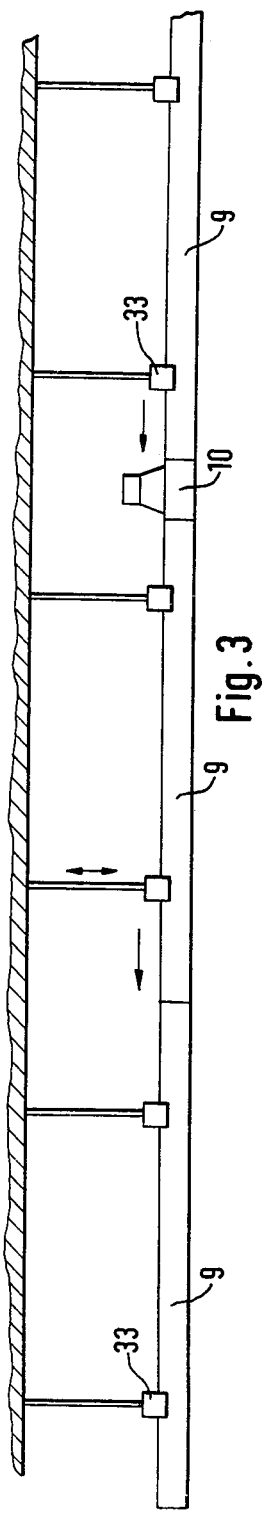

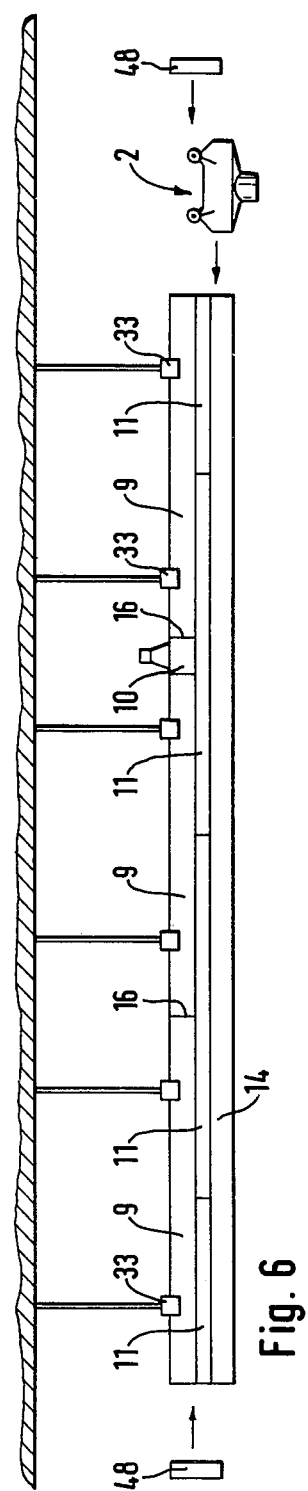
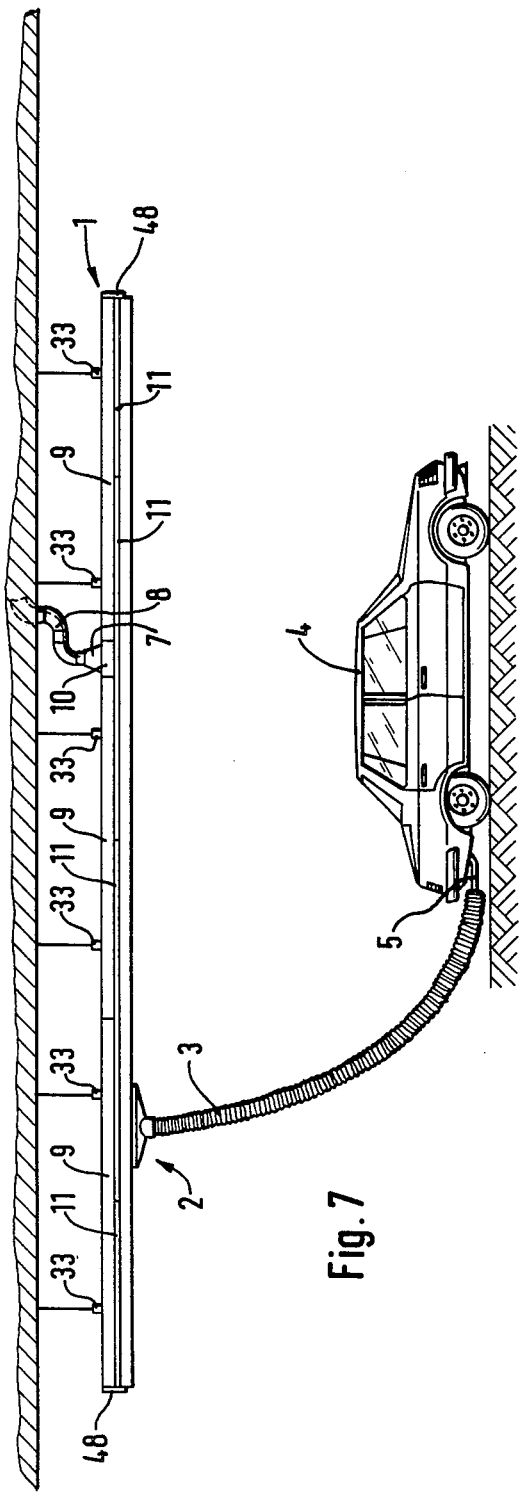
Fig. 6
Fig. 7

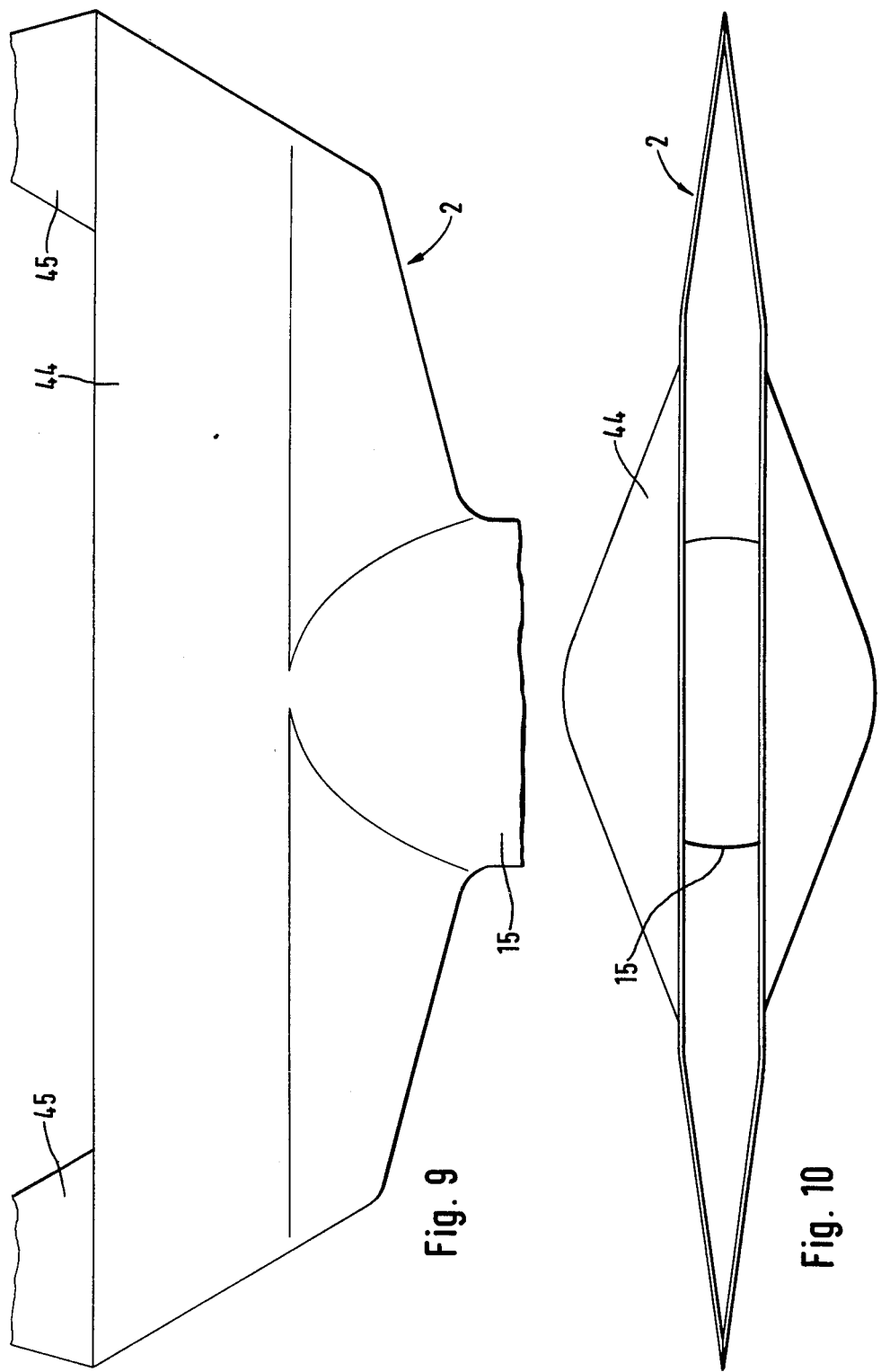

TRACK FORMING A GAS-THROUGHFLOW DUCT AND PROVIDED WITH A MOVABLE GAS PASSAGE UNIT

The present invention relates to a track constituting a gas-throughflow duct and provided with a gas-passage unit, and comprising, on one hand, structural girders interconnected to form an elongated structural beam, and, on the other hand, lateral sections arranged in pairs to form an elongated slot with is closed by interengaging sealing sections mounted on the lateral sections and sealingly engaging the gas-passage unit and, whilst maintaining their sealing function, enabling the gas-passage unit to be moved along the track.

It has been found rather laborious and manpower demanding to mount tracks of the above-disclosed type. In addition, it has been found that the required stability can only be attained by the use of specially designed connecting elements for interconnecting the structural girders forming part of the construction, although the interconnecting elements required involved high cost and extended mounting times.

The present invention has for its object to eliminate these drawbacks and to provide, with a minimum of parts, a track of the kind disclosed in the opening paragraph which is substantially realized by the feature that said lateral sections constitute connecting members for the interconnection of consecutive structural girder by extending past the butt joint between the structural girders.

The invention will be explained more in detail hereinafter with reference to the accompanying drawings, in which:

FIGS. 1 through 7 diagrammatically illustrate different steps of the track-mounting operation;

FIGS. 9 and 10 are a side elevational view and a top plan view, respectively, of a carriage which is movable on the track.

Figure 4:
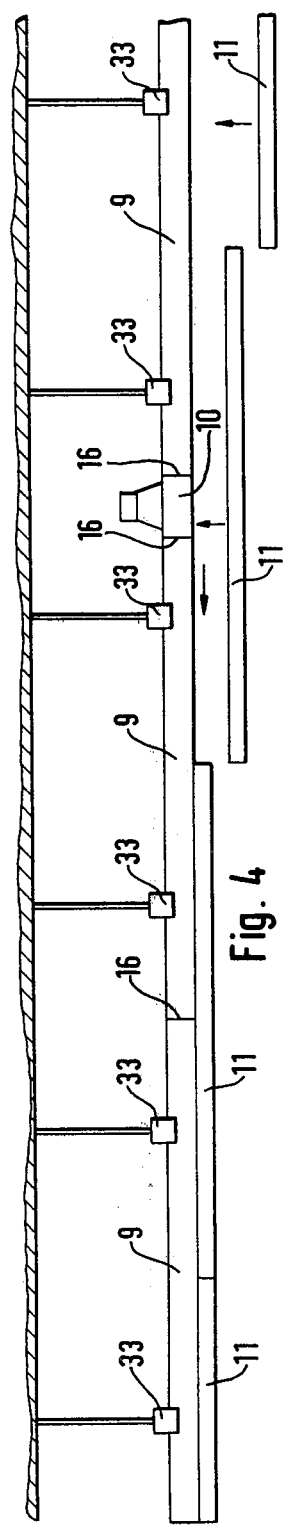

The track 1 illustrated on the drawings is an overhead track and adapted to allow gas to be conducted away from or supplied to some space along the track. Thus, for instance, exhaust gases from a motor vehicle can be carried away by moving a hose-carrying unit 2 along the track 1 until its hose 3 can be connected to the exhaust pipe 5 of the vehicle 4 (see FIG. 7), whereby the exhaust gases can be conducted into at least one through-flow passage 6 within the track 1 and through the latter into one (or more) gas conduits 7, which, through a duct 8 can be connected to a gas suction device, for instance a fan (not shown).

Thus, the track carries a gas passage unit and constitutes a gas-throughflow duct, as well as including, on one hand, structural girders 9 and 10 which are interconnected into an elongated structural beam and, on the other hand, lateral sections 11 attached to the structural girders 9, 10 and forming, in pairs, between them an elongated slot 13 which is closed by relatively interengaging sealing sections 14 mounted on the lateral sections 11 and allowing passage and mobility of the unit 2, the gas passage 15 of which serves for leading gas into or away from the gas-throughflow duct.

In order to realize a particularly rugged and simple track construction, the lateral sections 11 constituting the interconnecting members may extend from about the mid-point of a sectional girder 9 to about the mid-point of an abutting sectional girder 9.

A particularly rigid and simple track construction, when at least one structural girder is included, for instance a structural girder 10 with gas duct 7, 8, and which structural girder is disposed between two longer structural girders 9, is obtained by causing the lateral sections 11 constituting the interconnecting members to extend along the short structural girder 10, to extend past the joints 16 with the longer structural girders 9, and to extend along the longer structural girders 9.

The structural girders 9 and/or 10 are suitably designed for attaining a great load-carrying power for allowing different types of units 2 to be employed. To attain this with simple means, each structural girder 9 and/or 10 includes two opposite stiffening portions 17 forming inner and outer running surfaces 18 and 19, respectively, for supporting elements 20 or of unit 2 mounted inside and/or outside the gas through-flow duct 6. Any derailment tendencies of the unit 2 can be eliminated in a simple way by the opposite stiffening members 17 comprising portions 21 or 22 adapted to prevent upward movement of the supporting elements 20 away from the running surfaces 18 or 19.

In order to facilitate assembly of the track, each structural girder 9 and/or 10 may comprise two opposite hook portions 23 to which the lateral sections 11 are temporarily and definitely attachable by means of locking elements 24. To enable this with simple means, each hook portion 23 has an upwardly outwardly directed end 25, and in addition the portion 26 of each lateral section 11 mating with the hook portion 23 has two mutually adjacent recesses 27, 28. As a consequence of this, each lateral section 11 can initially be hooked temporarily onto the end portion 25 at its recess 28 and then be fixed so that the end portion 25 will engage the recess 28. The portion 26 then engages the end portion 25 with a point 29 thereof and will engage the internal portions of the hook portion 23 with a point 30 thereof.

In addition, the structural girder 9 and/or 10 may comprise two upwardly extending fastening flanges 31 having depending hook portions 32, suspension devices 33 having an extreme end part 34 engaging beneath the hook portions 32 and an adjustment or set screw 35 engaging the hook portions 32 from above. The screw 35 may suitably be so designed as to incise the hook portion 32 upon being screwed inward after hooking the structural girder 9 and/or 10 onto suspension devices 33. This construction will enable a rapid assembly and fixation of the parts so that the structural girder 9 and/or 10 cannot be displaced relative to the suspension devices 33. The latter suitably are arcuate elements mounted, for instance, to a ceiling structure by screw connections 36.

The structural girders 9 and/or 10 may comprise upper, centrally disposed ribs 37 forming between them an elongated, longitudinally extending recess 38 for receiving at least one structural-beam stiffening member 39 or at least one pipe connection 40.

To enable rapid connection of the sealing sections 14 to the lateral sections 11, each lateral section 11 may comprise a catch 41 for an elastically compressable and, after compression, expansible hook portion 42 of the sealing section 11. The hook portion 42 suitably has at least one recess 43 whereby the compression of the hook portion is facilitated.

Figure 8:
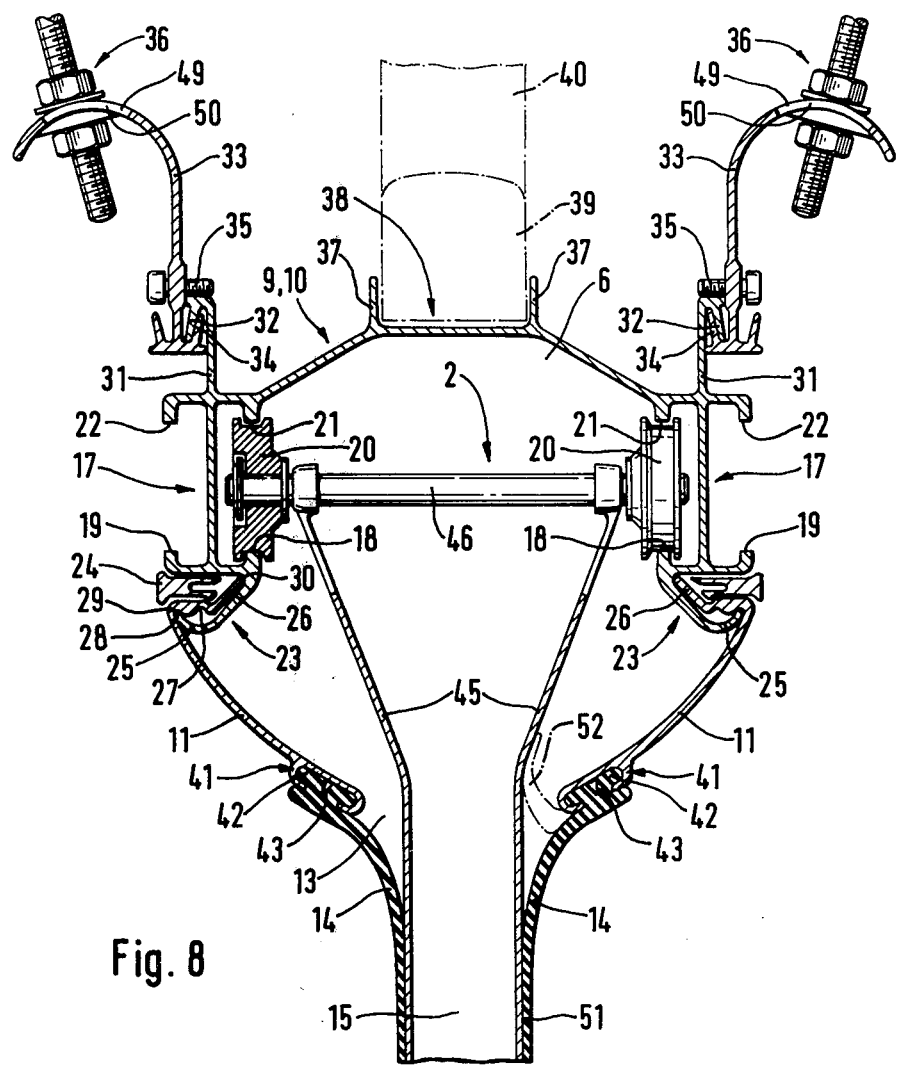
FIG. 8 is a cross-sectional view of the track.

FIGS. 9 and 10 illustrate a suitable unit 2 of a carriage-typ previously known per se. The carriage 2 illustrated comprises expander 44 which tapers towards its opposite ends in order to facilitate displacement of the sealing sections 11. The expander forms or is provided with one or more gas passeges and includes, on one hand, upwardly projecting arms 45 which are mounted on the shaft 46 with the supporting elements 20 (see FIG. 8) and, on the other hand, a depending connecting element 53 for the hose 3 or any corresponding element.

Figure 5:
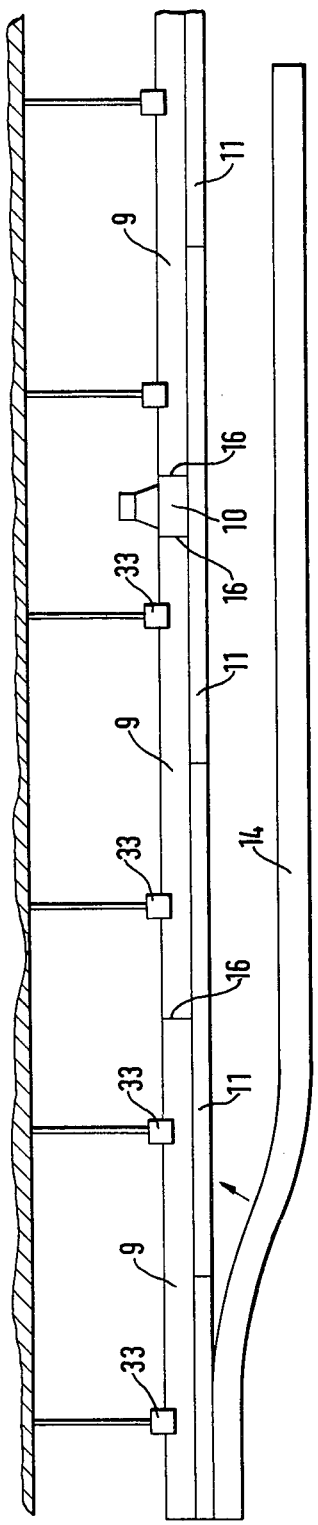

The mounting of the track may suitably take place as diagrammatically illustrated in the FIGS. 1 through 7, i.e. in the following manner:

(a) The suspension devices 33 are mounted to the ceiling 47 suitably spaced from each other (FIG. 1);

(b) The structural girders 9 and 10 are mounted on the suspension devices 33 (FIG. 2), their positions are adjusted, after which they are fixedly secured (FIG. 3);

(c) The lateral sections 11 are mounted in the manner described hereinbefore, so that they act to "lock" the structural girders 9 and 10 to each other (FIG. 4);

(d) The sealing sections 14 are mounted on the lateral sections 11 (FIG. 5);

(e) The unit 2 and end pieces 48 are assembled (FIG. 6);

(f) The ducting 7, 8 is connected.

This assembly can be made rapidly and by a minimum of personnel. The finished track will be structurally strong and stable without any need of complicated and costly components.

The design of the construction hereinbefore discribed may varied within the scope of the appended claims. Thus, for instance, the carriage illustrated may be replaced by a yoke carriage carrying one or more hose wind-up devices (not shown). This yoke carriage is disposed outside the duct 6 instead of inside this duct. It is also possible to use internal and external carriage units which suitably are movable independently of each other.

In order to facilitate the operation of mounting the track and, if necessary, to give the same a suitable inclination, the screw connections 36 or the like may engage elongated apertures or slots 50 in arcuate portions 49 of the suspension devices 33.

The installation comprising the track may be designed for conducting gas away from a space or for supplying gas to a space. The particular installation could even be employed for carrying away gas in certain instances and for supplying gas in other instances. This is enabled by the feature that the sealing section 14 comprises two legs 51, 52 one of which, 51, extends arcuately in a direction from the interior of the track, and the other leg 52 extends arcuately toward the interior of the track. This enables the sealing section 14, which is suitably made of or comprises elastomer material, to seal against both sub-atmospheric and super-atmospheric pressure within the through-flow passage 6.

The track forming the through-flow duct, of course, may comprise both at least one gas-supply duct and at least one gas evacuation or suction duct, and through the gas passage unit cables, hoses, ropes and like may be passed through and into the gas throughflow duct.

I claim:

1. A track forming a gas throughflow duct, the track being of the type adapted for guiding a movable gas passage unit therealong in sealing cooperation with the gas throughflow duct, the track comprising:

(a) a plurality of structural girders connected to each other through butt joints by which said girders are disposed in mutually, abutting, end-to-end relationship to form an elongated structural beam;

(b) means for effecting interconnection of said girders to each other in said abutting relationship;

(c) A plurality of lateral sections depending from said girders in spaced pairs, said lateral sections contributing to defining the gas throughflow duct, said lateral sections also defining a lower slot therebetween, each lateral section having an upper side and a lower side, said lateral sections mating with said girders in a connection region, said connecting region being adjacent said upper sides of said lateral sections;

(d) a plurality of interengaging sealing sections coupled with said lateral sections to seal said lower slot, said sealing sections being adapted to sealingly engage the movable gas passage unit and, while maintaining such seal, to allow the gas passage unit to be moved along said beam; said girders, lateral sections, and sealing sections together defining an interior duct passage;

(e) means, in said connecting region, for facilitating and effecting rapid coupling of said lateral sections to said girders;

(f) means, adjacent said lower sides of said lateral sections, for enabling rapid joining of said sealing sections to said lateral sections, said enabling means including catches adjacent said lower sides of said lateral sections; and (g) said means for effecting interconnection of said girders including said lateral sections, each lateral section extending longitudinally to either side of at least one of said butt joints.

2. A track as defined in claim 1 wherein each girder has a mid-point intermediate its ends and wherein, with respect to at least certain of said girders, said lateral sections extend from approximately the mid-point of one girder to approximately the mid-point of the next adjoining girder.

3. A track as defined in claim 1 wherein said beam includes at least one girder which is shorter than the others and wherein uninterrupted lateral sections extend along said shorter girder and past the butt joints between said shorter girder and its adjoining longer girders, the same lateral sections also extending partially along said adjoining longer structural girders.

4. A track as defined in claim 3 wherein said shorter structural girder includes a gas duct extending therefrom.

5. A track as defined in claim 1 wherein each structural girder comprises a pair of oppositely disposed, spaced stiffening portions, said stiffening portions forming runways disposed both interiorly and exteriorly of said duct passage for movably supporting the gas passage unit.

6. A track as defined in claim 5 wherein the gas passage unit includes wheels for facilitating movement along said beam, the wheels engaging said runways of said stiffening portions, said stiffening portions including oppositely disposed spaced runways cooperating with two sides of each wheel to prevent derailment.

7. A track as defined in claim 1 wherein said means for facilitating and effecting coupling includes pairs of oppositely disposed and oppositely facing hook portions on said girders and a plurality of locking elements which are of a separate piece from said girders and said lateral sections, said hook portions being of such configuration as to be capable of temporarily and positively suspending said lateral sections from said girders, said locking elements cooperating with said hook portions to fixedly secure said lateral sections to said girders.

8. A track as defined in claim 1 further including a plurality of suspension devices for holding said elongated structural beam in a suspended position, said structural girders including pairs of upwardly directed fastening flanges having depending hook members thereon, said suspension devices having outer portions engaging with said hook members of said fastening flanges, said suspension devices also having adjustable screws which engage said fastening flanges above said hook members thereof.

9. A track as defined in claim 8 including means for incising said hook member of said fastening flanges after connection of said fastening flanges to said suspension devices, said incising means including said adjustable screw.

10. A track as defined in claim 1 wherein each girder includes a top face and a plurality of rims extending from said top face, said rims defining therebetween a longitudinally extending recess.

11. A track as defined in claim 10 including a beam stiffening element coupled with said beam, said beam stiffening element being disposed in said recess.

12. A track as defined in claim 10 including a pipe connection conduit communicating with said interior duct passage, said pipe connection conduit extending from said recess in said top face of one of said girders.

13. A track as defined in claim 1 wherein said means for enabling rapid joining includes portions on said sealing sections which are elastically compressible and which, after compression, are expansible, said compressible sections cooperating with said catches of said lateral sections for joining said sealing sections thereto.

14. A track as defined in claim 1 including a plurality of suspension devices coupled with said girders and fastening elements coupled with said suspension devices for holding said girders in a suspended position, said suspension devices including arcuate parts and a plurality of elongated slots formed in said arcuate parts, said fastening elements engaging said elongated slots of said suspension devices.

15. A track as defined in claim 1 wherein each sealing section includes two legs one of which extends arcuately in a concave outward configuration with respect to said interior duct passage, the other of which extends arcuately in a concave inward configuration with respect to said interior duct passage.

* * * * *